United States Patent
Karpov et al.

(10) Patent No.: US 8,747,804 B2
(45) Date of Patent: Jun. 10, 2014

(54) MODIFIED ZINC OXIDE PARTICLES

(75) Inventors: Andrey Karpov, Mannheim (DE); Hartmut Hibst, Schriesheim (DE); Simon Schambony, Ludwigshafen (DE); Richard Riggs, Mannheim (DE); Sylke Haremza, Neckargemuend (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/054,636

(22) PCT Filed: Jul. 14, 2009

(86) PCT No.: PCT/EP2009/058946
§ 371 (c)(1),
(2), (4) Date: Jan. 18, 2011

(87) PCT Pub. No.: WO2010/007039
PCT Pub. Date: Jan. 21, 2010

(65) Prior Publication Data
US 2011/0130273 A1    Jun. 2, 2011

(30) Foreign Application Priority Data
Jul. 18, 2008  (EP) ................... 08160755

(51) Int. Cl.
*C01G 9/02* (2006.01)

(52) U.S. Cl.
USPC .......................... 423/622; 423/265

(58) Field of Classification Search
USPC ................. 423/622, 265
See application file for complete search history.

(56) References Cited

U.S. PATENT DOCUMENTS

| | | | |
|---|---|---|---|
| 6,710,091 B1 | 3/2004 | Womelsdorf et al. | |
| 2002/0131941 A1* | 9/2002 | Habeck et al. | 424/63 |
| 2005/0260122 A1 | 11/2005 | Li et al. | |
| 2007/0218019 A1* | 9/2007 | Andre et al. | 424/59 |

FOREIGN PATENT DOCUMENTS

| | | |
|---|---|---|
| DE | 199 07 704 | 8/2000 |
| EP | 1 110 999 | 6/2001 |
| EP | 1 191 041 | 3/2002 |
| JP | 4 357114 | 12/1992 |
| JP | 11 279524 | 10/1999 |
| JP | 11-279524 A | 10/1999 |
| JP | 2003-286292 A | 10/2003 |
| WO | 99 40123 | 8/1999 |
| WO | 00 50503 | 8/2000 |
| WO | 01 05499 | 1/2001 |
| WO | 2004 052327 | 6/2004 |
| WO | 2004 111136 | 12/2004 |
| WO | 2006 099952 | 9/2006 |
| WO | 2006 138071 | 12/2006 |
| WO | 2006 138072 | 12/2006 |

OTHER PUBLICATIONS

International Search Report issued Oct. 6, 2009 in PCT/EP09/058946 filed Jul. 14, 2009.
U.S. Appl. No. 13/379,247, filed Dec. 19, 2011, Riggs, et al.
U.S. Appl. No. 13/266,609, filed Oct. 27, 2011, Harmeza, et al.
English translation of the Office Action issued Nov. 5, 2013 in Japanese Patent Application No. 2011-517896.

* cited by examiner

*Primary Examiner* — Steven Bos
(74) *Attorney, Agent, or Firm* — Oblon, Spivak, McClelland, Maier & Neustadt, L.L.P.

(57) ABSTRACT

Process for the preparation of modified ZnO particles in which a zinc salt and a base are mixed in a polar solvent and, if appropriate after the precipitation of a precipitation product, the polar solvent is removed and a residue is obtained, where the residue is taken up in a nonpolar solvent, surface-active substances are added, optionally further effect substances are added and then the modified ZnO particles are separated off from further by-products. Materials such as plastics, coatings or paints comprising modified ZnO particles. Methods for the incorporation of modified ZnO particles into materials, where the modified ZnO particles are incorporated into the materials in the form of dispersions or suspensions. Use of modified ZnO particles for protecting material against the effect of light, heat, oxygen or free radicals, as catalysts, for semiconductive films or cosmetic applications.

15 Claims, No Drawings

MODIFIED ZINC OXIDE PARTICLES

The present invention relates to processes for the preparation of modified zinc oxide particles. The invention further relates to selected modified zinc oxide particles. Uses of modified zinc oxide particles prepared by these processes, in particular in the finishing of plastics, in catalysts or as semiconductive films, are likewise provided by the invention. Further subject matters of the invention are materials which comprise modified zinc oxide particles which have been produced by this process and methods for the incorporation of modified zinc oxides into these materials.

Further embodiments of the present invention can be found in the claims, the description and the examples. It goes without saying that the features specified above and still to be explained below of the subject matter according to the invention can be used not only in the combinations specifically stated in each case, but also in other combinations without departing from the scope of the invention. The embodiments of the present invention in which all of the features have the preferred or very preferred meanings are preferred or very preferred, respectively.

The preparation of zinc oxide ("ZnO") by so-called dry and wet processes is known.

The dry process comprises the combustion of metallic zinc. The often aggregated particles of the zinc oxides obtained by means of the dry process are characterized by a broad size distribution in the micrometer range and beyond.

Finely divided zinc oxide is prepared primarily by wet-chemical means by precipitation processes. Precipitation in aqueous solution generally produces hydroxide- and/or carbonate-containing materials which are thermally converted to zinc oxide. The thermal aftertreatment here has a negative impact on the finely divided nature since the particles are subjected to sintering processes which lead to the formation of micrometer-sized aggregates which can only be reduced to the primary particles incompletely through grinding.

DE 199 07 704 A1 describes a nanoscale zinc oxide prepared via a precipitation reaction. Here, the nanoscale zinc oxide is prepared starting from a zinc acetate solution via an alkaline precipitation. The centrifuged-off zinc oxide can be redispersed to give a sol by adding methylene chloride. Owing to a lack of surface modification, the zinc oxide dispersions prepared in this way do not have adequate long-term stability.

US 2005/0260122 A1 describes a process for the preparation of nanoparticulate oxidic particles (Al, Ti, Fe, Cu, Zr oxides and others, including ZnO) by initially introducing an alkaline alcoholic solution or suspension with a pH of >7 and adding an alcoholic solution of a metal salt, where metal salt solutions are added to alkaline solutions and the pH of >7 is maintained during the entire reaction.

WO 2004/052327 A2 describes a surface-modified nanoscale zinc oxide, where the surface modification a coating with an organic acid of the general formula HOOC—$R_1$—$(CH_2)_n$—$R_2$—$CH_3$, where $R_1$=$CH_2$—(O—$CH_2$—$CH_2)_m$ where m=0 to 11, n=0 to 30, where when m=0, n is greater than 11, and $R_2$=$CH_2$, $CHCH_3$, $C(CH_3)_2$, phenylene, O, S. According to WO 2004/052327 A2, these surface-modified zinc oxides form stable dispersions in a liquid medium. The preparation of a surface-modified nanoscale zinc oxide takes place in accordance with example 1 of WO 2004/052327 A2 starting from $ZnCl_2$ by adding NaOH in methanol. The resulting precipitate of NaCl and ZnO is recovered and admixed with isostearic acid in THF. NaCl remains as insoluble precipitate, while the surface-modified zinc oxide is converted into solution and separated off.

JP 04-357114 describes processes for the preparation of nanoscale ZnO with a particle size of less than 50 nm through hydrolysis of a Zn salt in an alcoholic solution or in a mixture of an alcohol and water at a temperature of ≥60° C. and a pH of ≤9. If the reaction temperature is ≤60° C. or the pH is ≤9, a ZnO hydrosol is formed. If necessary, a surface modification can be carried out in organic solvent.

JP 11-279524 describes a process for the preparation of a dispersion of nanoparticulate ZnO particles with particle sizes between one and 20 nm by mixing an ethanolic solution of a Zn salt with an ethanolic solution of an alkali at a pH of ≤8. If necessary, a hydrophobic compound soluble in ethanol can then be combined with a polar group (e.g. oleic acid, stearic acid).

WO 00/50503 A1 describes nanoscale zinc oxide gels comprising ZnO particles smaller than 15 nm which are prepared by basic hydrolysis of a Zn compound in alcohol (or in an alcohol/water mixture). The hydrolysis is carried out, if appropriate, together with suitable surface modifiers. The process is characterized in that the precipitation arising during the hydrolysis is left to ripen until the ZnO has completely flocculated out, which is then compacted to give a gel and separated off from the supernatant phase (by-products).

In the mentioned processes of the prior art, the preparation of the ZnO particles takes place partially without stabilization of the dispersed or redispersed particles. In some cases, however, stabilization of the particles is achieved through surface modification. The processes proposed in the prior art for the preparation of the modified ZnO particles often comprise a large number of separation and purification steps. There is a need to improve the long-term stability of ZnO particles prepared using simplified processes, especially in dispersions or suspensions.

Furthermore, in the case of the finishing of inanimate organic materials, in particular plastics, with functional additives, for example with UV absorbers, the problem often arises that the functional additives leave the polymer matrix over the course of time, for example by migrating to the surface of the polymer (migration). Furthermore, there is therefore the need to increase the stability (service life) of functional additives in inanimate organic polymers.

It was therefore the object of the present invention to provide processes for the preparation of modified ZnO particles which are based on a simple and controlled preparation and in this connection make do with the fewest possible separation and purification steps. It was a further object of the invention to find further and improved preparation processes which permit efficient access to migration-stable functional additives with increased stability.

As is evident from the disclosure of the present invention, these and other objects are achieved through the various embodiments of the process according to the invention, which are described below.

Surprisingly, it has been found that these objects are achieved by a process for the preparation of modified ZnO particles in which a zinc salt and a base are mixed in a polar solvent and, if appropriate, after the precipitation of a precipitation product, the polar solvent is removed and a residue is obtained, where the process comprises the following steps a. the residue is taken up in a nonpolar solvent,
 b. surface-active substances are added,
 c. optionally further effect substances are added and then
 d. the modified ZnO particles are separated off from by-products.

Within the context of this invention, expressions of the form $C_a$-$C_b$ refer to chemical compounds or substituents with a certain number of carbon atoms. The number of carbon atoms can be selected from the entire range from a to b, including a and b, a is at least 1 and b is always greater than a. The chemical compounds or the substituents are further specified by expressions of the form $C_a$-$C_b$—V. V here is a chemical compound class or substituent class, for example alkyl compounds or alkyl substituents.

Halogen is fluorine, chlorine, bromine or iodine, preferably fluorine, chlorine or bromine, particularly preferably chlorine.

Specifically, the collective terms specified for the various substituents have the following meaning:

$C_1$-$C_{20}$-Alkyl: straight-chain or branched hydrocarbon radicals having up to 20 carbon atoms, for example $C_1$-$C_{10}$-alkyl or $C_{11}$-$C_{20}$-alkyl, preferably $C_1$-$C_{10}$-alkyl, for example $C_1$-$C_3$-alkyl, such as methyl, ethyl, propyl, isopropyl, or $C_4$-$C_6$-alkyl, n-butyl, sec-butyl, tert-butyl, 1,1-dimethylethyl, pentyl, 2-methylbutyl, 1,1-dimethylpropyl, 1,2-dimethylpropyl, 2,2-dimethylpropyl, 1-ethylpropyl, hexyl, 2-methylpentyl, 3-methyl-pentyl, 1,1-dimethylbutyl, 1,2-dimethylbutyl, 1,3-dimethylbutyl, 2,2-dimethylbutyl, 2,3-dimethylbutyl, 3,3-dimethylbutyl, 2-ethylbutyl, 1,1,2-trimethylpropyl, 1,2,2-tri-methylpropyl, 1-ethyl-1-methylpropyl, 1-ethyl-2-methylpropyl, or $C_7$-$C_{10}$-alkyl, such as heptyl, octyl, 2-ethylhexyl, 2,4,4-trimethylpentyl, 1,1,3,3-tetramethylbutyl, nonyl or decyl, and isomers thereof.

$C_1$-$C_{21}$-Alkylcarbonyl: a hydrogen atom or a straight-chain or branched alkyl group having 1 to 20 carbon atoms (as specified above), which is attached via a carbonyl group (—CO—), preferably $C_1$-$C_{13}$-alkylcarbonyl, such as, for example, formyl, acetyl, n- or isopropionyl, n-, iso-, sec- or tert-butanoyl, n-, iso-, sec- or tert-pentanoyl, n- or iso-nonanoyl, n-dodecanoyl.

Aryl: a mono- to trinuclear aromatic ring system comprising 6 to 14 carbon ring members, e.g. phenyl, naphthyl or anthracenyl, preferably a mono- to binuclear, particularly preferably a mononuclear, aromatic ring system.

Aryloxy is a mono- to trinuclear aromatic ring system (as specified above) which is attached via an oxygen atom (—O—), preferably a mono- to binuclear, particularly preferably a mononuclear, aromatic ring system.

Arylalkyl is a mono- to trinuclear aromatic ring system (as specified above) which is attached via a $C_1$-$C_{20}$-alkylene group, preferably a mono- to binuclear, particularly preferably a mononuclear, aromatic ring system.

$C_1$-$C_{20}$-Alkylene: straight-chain or branched hydrocarbon radicals having 1 to 20 carbon atoms, for example $C_1$-$C_{10}$-alkylene or $C_{11}$-$C_{20}$-alkylene, preferably $C_1$-$C_{10}$-alkylene, in particular methylene, dimethylene, trimethylene, tetramethylene, pentamethylene or hexamethylene.

Heterocycles: five- to twelve-membered, preferably five- to nine-membered, particularly preferably five- to six-membered, ring systems having oxygen atoms, nitrogen atoms and/or sulfur atoms, if appropriate two or more rings, such as furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

$C_1$-$C_{20}$-Alkoxy is a straight-chain or branched alkyl group having 1 to 20 carbon atoms (as specified above) which are attached via an oxygen atom (—O—), for example $C_1$-$C_{10}$-alkoxy or $C_{11}$-$C_{20}$-alkoxy, preferably $C_1$-$C_{10}$-alkyloxy, particularly preferably $C_1$-$C_3$-alkoxy, such as, for example, methoxy, ethoxy, propoxy.

Heteroatoms are preferably oxygen, nitrogen, sulfur or phosphorus atoms whose free valences are, if appropriate, saturated by hydrogen.

Within the context of this application, "nanoparticles" are understood as meaning particles which have a particle size of from 1 nm to 500 nm.

To determine the particle size of nanoparticles, in particular also of nanoparticulate modified ZnO, the person skilled in the art has available to him a series of different methods which depend on the composition of the particles and can sometimes produce differing results with regard to the particle size. For example, the particle size can be determined by measurements with the help of a transmission electron microscope (TEM), dynamic light scattering (DLS) or measurements of the UV absorption wavelength. Within the context of the present application, particle sizes are determined, if possible, with the help of measurements of a transmission electron microscope (TEM). For an ideally spherical shape of the nanoparticles, the particle size would correspond to the particle diameter. Of course the agglomerates, possibly forming as a result of a juxtaposition of nanoparticles, of the initially forming primary particles can also be larger than 500 nm.

The term "ZnO particles" refers to particles which consist essentially of zinc oxide, it being possible for these particles to also have a certain hydroxide concentration on their surface, depending on the particular environmental conditions, as is known to the person skilled in the art from the prior art (Dissertation, B. Rohe, "Characterization and Applications of uncoated, silane-coated and UV-modified nano zinc oxides", Duisburg-Essen University, 2005, p. 49, 90—Synthesis). The ZnO particles are therefore sometimes ZnO/zinc hydroxide/zinc oxide hydrate particles. The ZnO particles are preferably nanoparticles. Moreover, it is also possible, for example depending on the nature of the zinc salt, for anions of the zinc salt to be located on the ZnO surface, for example acetate groups in the case of the use of $Zn(OAc)_2$ or $Zn(OAc)_2$ dihydrate (cf. Sakohara et al. J. Chem. Eng. Jap. 2001, 34, 15-21; Anderson et al. J. Phys. Chem. B 1998, 102, 10169-10175, Sun et al. J. Sol-Gel Sci. Technol. 2007, 43, 237-243). The ZnO particles particularly preferably have a particle diameter of less than 100 nm and in particular of less than 30 nm. Within the context of this invention, ZnO particles are also referred to as zinc oxide particles.

The term "modified ZnO particles" refers to ZnO particles which interact with surface-active substances and optionally further effect substances. Here, the nature of the interaction is fundamentally arbitrary. Preferably, however, the interaction is via a chemical bonding of the surface-active substances or optionally of the further effect substances to the ZnO particles. Furthermore, it is preferably an ionic interaction (Coulomb interaction), an interaction via hydrogen bridge bonds and/or a dipole/dipole interaction. The interaction may of course also be a combination of the aforementioned possibilities. The modified ZnO particles are preferably nanoparticles. The modified ZnO particles particularly preferably have a particle diameter of less than 100 nm and in particular of less than 30 nm.

Within the context of this invention, the term "solvent" is also used by way of representation for diluents. The compounds dissolved in the solvent are present either in molecularly dissolved form, suspended form, dispersed form or emulsified form in the solvent or in contact with the solvent. Solvents are of course also to be understood as meaning mixtures of solvents.

"Liquid formulations" of the modified ZnO particles are solutions, dispersions or suspensions of the modified ZnO particles.

"Solid formulations" of the modified ZnO particles are solid-phase mixtures comprising modified ZnO particles, for example dispersions of the modified ZnO particles in a polymeric matrix, such as, for example, in polymers, oligomeric olefins, waxes, e.g. Luwax®, or in a masterbatch.

All solubilities are measured at room temperature (21° C.) and standard pressure (1 atm). Methods for determining solubility are known to the person skilled in the art from the prior art and a multitude of solubility data is known.

The zinc salt used within the context of the process according to the invention is fundamentally of any desired nature, with the proviso that the zinc salt at least partially dissolves (>0.1 g/l) in the polar solvent used. Preferably, the majority of the zinc salt dissolves in the polar solvent (>1 g/l) and in particular complete dissolution (>10 g/l) of the zinc salt in the polar solvent takes place. The solubility of the zinc salts in the polar solvent can be determined routinely by the person skilled in the art. It is of course also possible to use mixtures of different zinc salts. Many zinc salts are commercially available.

Preferably, the zinc salt used is inorganic zinc salts. The zinc salt used is particularly preferably zinc acetate, zinc acetate dihydrate or zinc halide, in particular zinc chloride. Zinc salts can also be produced in situ by dissolving ZnO in corresponding acid.

In a further preferred embodiment of the process according to the invention, the zinc salt used is an organic zinc salt. The organic zinc salt used is particularly preferably a zinc salt of a saturated and/or unsaturated carboxylic acid having 10 to 30 carbon atoms, in particular from 12 to 20. The organic zinc salt is in particular zinc laurate, zinc myristate, zinc palmitate, zinc oleate, zinc stearate, zinc isostearate, zinc linolenate, zinc linolate, zinc ricinoleate. Very particular preference is given to using zinc oleate.

In a further preferred embodiment of the process according to the invention, a mixture of inorganic and organic zinc salts is used as zinc salt. Preferably, the molar mixing ratio of the inorganic to organic zinc salt here is from 1:1 to 20:1, particularly preferably from 2:1 to 9:1, based on Zn. Particular preference is given to using a mixture of zinc chloride with zinc oleate or zinc acetate dihydrate with zinc oleate.

The base used within the context of the process according to the invention is fundamentally of any desired nature, with the proviso that the base at least partially dissolves (>0.1 g/l) in the polar solvent used. Preferably, the majority of the base dissolves in the polar solvent (>1 g/l) and in particular complete dissolution (>10 g/l) of the base in the polar solvent takes place. The solubility of the base in the polar solvent can be determined routinely by the person skilled in the art. It is of course also possible to use mixtures of different bases. Many bases are commercially available.

Preferably, the base used is alkali metal hydroxide, alkaline earth metal hydroxide or ammonium hydroxide. Particular preference is given to using an alkali metal hydroxide, in particular lithium hydroxide, sodium hydroxide or potassium hydroxide.

In a further preferred embodiment of the process according to the invention, the base used is an alkali metal salt of an organic acid. The organic alkali metal salt used is particularly preferably an alkali metal salt of a saturated and/or unsaturated, carboxylic acid having 10 to 30 carbon atoms, in particular from 12 to 20. In particular, the organic alkali metal salt is sodium or potassium laurate, sodium or potassium myristate, sodium or potassium palmitate, sodium or potassium oleate, sodium or potassium stearate, sodium or potassium isostearate, sodium or potassium linolenate, sodium or potassium linolate, sodium or potassium ricinoleate. Very particular preference is given to using sodium or potassium oleate.

In a further preferred embodiment of the process according to the invention, the base used is a mixture of alkali metal hydroxide and an alkali metal salt of an organic acid. Preferably, the molar mixing ratio of the alkali metal hydroxide to the alkali metal salt of the organic acid is from 1:1 to 20:1, particularly preferably from 2:1 to 9:1, based on alkali metal. Particular preference is given to using a mixture of sodium hydroxide with sodium acetate or sodium oleate or potassium hydroxide with potassium acetate or potassium oleate.

Within the context of the process according to the invention, suitable polar solvents are all solvents with a dielectric constant greater than 10, preferably greater than 15, with the proviso that the zinc salt and the base, as described above, at least partially dissolve in the solvent. In general, in the presence of the zinc salt and of the base, zinc oxide is formed, in particular ZnO particles and if appropriate further by-products.

The zinc salt and the base can be added to the polar solvent either together, simultaneously or successively, or it is possible to prepare separate solutions of the zinc salt and of the base and then to mix them together.

In a preferred embodiment of the process according to the invention, the zinc salt is dissolved in the polar solvent at elevated temperature, particularly preferably at a temperature greater than 40° C., in particular at a temperature greater than 50° C. The temperature at which the zinc salt is dissolved in the polar solvent is here in general below the boiling temperature of the polar solvent or solvent mixture.

In a further embodiment, the base can also be added in solid form, for example in flake or pellet form to the zinc salt solution, or the zinc salt can be added in solid form, for example as zinc salt powder, to the solution of the base.

The quantitative ratio of zinc salt to base can vary within a wide range depending, for example, on the type of zinc salt. Preferably, the quantitative ratio is selected such that a molar ratio of hydroxide ions to zinc, or $Zn^{2+}$, of from 1.0 to 3.0, preferably from 1.5 to 2.5 and in particular from 1.7 to 2.2 arises.

In a preferred embodiment of the process according to the invention, the formation of the zinc oxide, in particular of the ZnO particles and if appropriate further by-products takes place at a temperature in the range from 0 to 200° C. Preferably, the formation takes place at temperatures in the range from 40 to 150° C.

The pressure is of secondary importance for carrying out the process according to the invention. In general, all of the steps are carried out at an external pressure of 1 atm. If appropriate, individual steps, for example distillation steps, are carried out at reduced pressure (<1 atm).

As a rule, the zinc oxide formed in the course of the process according to the invention is at least partially insoluble (<1 g/l) in the polar solvent and a precipitation product is formed. Preferably, the zinc oxide is insoluble in the polar solvent for the most part (<0.5 g/l) in particular completely (<0.1 g/l) such that the precipitation of the precipitation product proceeds as completely as possible. In general, as well as the zinc oxide, the precipitation product also comprises further by-products. These by-products may be soluble in polar solvents, partially insoluble (<1 g/l), for the most part (<0.5 g/l) or completely (<0.1 g/l) insoluble. It is an advantage of the process according to the invention that the further by-products can be separated off efficiently, irrespective of their solubility in the polar solvent, for example without the use of large amounts of solvent.

The polar solvent used is preferably water, alcoholic solvents, aqueous solvents or else alcohol/water mixtures. The solvents used are particularly preferably methanol, ethanol, 1-propanol, 2-propanol, water or mixtures of methanol, ethanol, 1-propanol, 2-propanol and water.

The quantitative ratio between polar solvent and zinc salt or base can, in the course of the process according to the invention, be adjusted over a wide range, for example depending on the particular solvent. As a rule, the solvent is used in excess. Preferably, the amount of solvent is selected such that a concentration of dissolved zinc, or $Zn^{2+}$, of from 0.1 to 2 mol/liter, particularly preferably from 0.2 to 1 mol/liter, arises.

Following the formation of the zinc oxide, in particular of ZnO particles and if appropriate of further by-products, the polar solvent is removed and a residue is obtained which, besides the zinc oxide, comprises if appropriate further by-products.

In a preferred embodiment of the process according to the invention, the precipitation product precipitates out partially or completely during the removal of the polar solvent. The removal of the polar solvent can take place by any desired method, in which the residue comprising zinc oxide, in particular ZnO particles and if appropriate further by-products is obtained. Preferably, the polar solvent is removed by distillation, filtration, centrifugation or decantation. Particular preference is given to distillation.

In the course of the process according to the invention, (step a.) the residue comprising zinc oxide, in particular ZnO particles and if appropriate further by-products is taken up in a nonpolar solvent and (step b.) surface-active substances are added. Preferably, the zinc oxide is taken up in the nonpolar solvent (step a.) at a temperature selected from the range from 20° C. up to the boiling temperature of the solvent. The addition of the surface-active substances generally likewise takes place in this temperature range (step b.). Preferably, a further reaction of the zinc oxide with the surface-active substance takes place in order to permit increased interaction of the ZnO particles with the surface-active substance, particularly preferably at elevated temperature, in particular at a temperature selected from the range from 50° C. up to the boiling temperature of the nonpolar solvent.

Suitable nonpolar solvents are in principle all solvents with a dielectric constant of less than 5, preferably of less than 2.5. The use of mixtures of nonpolar solvents is of course also possible. Preferred suitable nonpolar solvents are aromatic hydrocarbons, e.g. benzene, naphthalene, or aliphatic hydrocarbons, e.g. pentane, hexane. Particular preference is given to alkyl aromatics or mixtures thereof, for example toluene, o-, m-, p-xylene, Solvesso 100. Nonpolar solvents are generally commercially available.

The quantitative ratio between nonpolar solvent and residue (zinc oxide, if appropriate with further by-products) can be adjusted in the course of the process according to the invention (step a.) over a wide range, for example depending on the particular solvent. As a rule, the nonpolar solvent is used in excess. Preferably, the amount of nonpolar solvent is selected such that a content of residue (zinc oxide, if appropriate with further by-products), of from 0.5 to 20% by weight, particularly preferably from 1.0 to 10% by weight, based on the total amount of nonpolar solvent and residue, arises.

In the course of the process according to the invention (step b.), the surface-active substances used are preferably substances with an HLB value (according to Griffin) of from 0 to 9, in particular from 0.5 to 5. The surface-active substances used are particularly preferably ionic, nonionic, betainic, zwitterionic surfactants, in particular anionic surfactants. Surface-active substances are generally commercially available and can of course be used as mixtures.

The surface-active substance can of course additionally also have further functionalities, in particular the functionalities of the optional further effect substances. For example, the surface-active substances used may be compounds which preferably have an HLB value (according to Griffin) of from 0 to 9, and additionally act as UV absorber and/or stabilizer. Very preferably, in one embodiment of the process according to the invention, the surface-active substances additionally act as UV absorber.

The amount of surface-active substances can vary within a wide range depending, for example, on the particular nonpolar solvent. Preferably, in the course of the process according to the invention, 1-100% by weight, particularly preferably 5-60% by weight and in particular 10-30% by weight, of surface-active substances, based on the amount of residue (zinc oxide, if appropriate with further by-products) are used.

In one embodiment of the process according to the invention, the surface-active substances used are preferably carboxylic acids having 10 to 30 carbon atoms, particularly preferably unsaturated and saturated fatty acids. Very particular preference is given to oleic acid, linoleic acid, linolenic acid, stearic acid, ricinoleic acid, lauric acid, palmitic acid, margaric acid.

In a further embodiment of the process according to the invention, the nonpolar solvent used is preferably alkyl aromatics or mixtures thereof (step a.) and the surface-active substances used are carboxylic acids having 10 to 30 carbon atoms (step b.).

In principle, the surface-active substances interact in the nonpolar solvent with the ZnO particles, as described above. In general, in this connection the resulting modified ZnO particles are at least partially soluble (>1 g/l) in the nonpolar solvent. Preferably, the modified ZnO particles are soluble for the greatest part (>10 g/l), in particular completely (>50 g/l) in the nonpolar solvent.

In principle, the further by-products present if appropriate in the residue are also at least partially insoluble (<1 g/l) in the presence of the surface-active substances in the nonpolar solvent. Preferably, the if appropriate further by-products are insoluble in the polar solvent for the main part (<0.5 g/l), in particular completely (<0.1 g/l.

In general, the above-described insolubility of the further by-products present if appropriate in the residue permits simplified separation of the modified ZnO particles from the further by-products (step d.). The further by-products are often inorganic by-products, in particular alkali metal or alkaline earth metal salts, for example alkali metal halides, e.g. NaCl, KCl, alkali metal acetates, alkaline earth metal halides or alkaline earth metal acetates. Removal of these by-products in the course of the process according to the invention is advantageous in a number of applications in which zinc oxide in high purity is required, an example which may be mentioned here being the use of zinc oxide as semiconductor in thin-film transistors (cf. WO 2006/138072).

In general, the modified ZnO particles prepared by the process according to the invention comprise, following removal of the further by-products (step d.), a remainder of less than 10% by weight of further by-products, based on the total amount of modified ZnO particles and further by-products. Preferably, less than 5% by weight and particularly preferably less than 2% by weight of further by-products are present.

The further by-products can be separated off (step d.) by any desired method. Preferably, the further by-products are removed by filtration, centrifugation, separation in a separating funnel or decantation. Particular preference is given to filtration. Separation in the separating funnel is likewise particularly preferred.

After separating off the further by-products (step d.), a suspension (or dispersion) of the modified ZnO particles in the nonpolar solvent is generally obtained; this is further provided by the present invention. This suspension (or dispersion) can be further processed directly, in concentrated form, or as liquid formulation or the modified ZnO particles can be isolated through the removal of the nonpolar solvent in a further optional process step as solid. The person skilled in the art can carry out the removal of the nonpolar solvent as described above for the polar solvent.

The modified ZnO particles present as solid can be converted again to liquid formulations, for example with the help of nonpolar solvents, or be further processed or used as solid by itself or in the form of solid formulations.

This optional isolation can of course also be followed by further purification steps for the modified ZnO particles, for example through washing operations.

The present invention further provides materials, in particular plastics, coatings or paints which comprise modified ZnO particles prepared according to the invention. Within the context of this application, materials are to be understood as meaning inanimate materials. Preferably, plastics can be mentioned as materials. Within the context of this application, plastics are also referred to as polymers.

The incorporation of the modified ZnO particles into materials takes place analogously to known methods for incorporating ZnO particles into materials. For example, mention may be made here of the finishing of polymers (plastics) with zinc oxide during an extrusion step or the preparation of solid or liquid cosmetic formulations comprising zinc oxide.

Optionally, in the course of the process according to the invention (step c.), further effect substances are added. In principle, the nature of the further effect substances is arbitrary, with the proviso that they interact with the modified ZnO particles. The interaction with the modified ZnO particles takes place analogously to that already stated for the interaction between surface-active substances and ZnO particles. Furthermore, as already described above, both ZnO particles in interaction with surface-active substances, and also ZnO particles in interaction with surface-active substances and effect substances are referred to as modified ZnO particles. The addition of the further effect substances generally takes place in the range from 20° C. up to the boiling temperature of the nonpolar solvent. Preferably, a further reaction of the zinc oxide with the further effect substances takes place in order to permit increased interaction of the ZnO particles with further effect substances, particularly preferably at elevated temperature, in particular at a temperature selected from the range from 50° C. up to the boiling temperature of the nonpolar solvent.

The further effect substances are used in order to give the modified ZnO particles an additional functionality which they may require for a subsequent application.

Further effect substances which may be used are UV absorbers, stabilizers, flame retardants, antioxidants, antifogging agents, lubricants, antiblocking agents, organic dyes, IR dyes, fluorescent dyes, brighteners, antistatic agents, biocides, nucleating agents, herbicides, fungicides or pesticides, free-radical scavengers.

The present invention further provides materials, in particular plastics, coatings or paints, in particular plastics, which comprise modified ZnO particles prepared according to the invention comprising further effect substances. The incorporation of these modified ZnO particles into materials takes place analogously to known methods for the incorporation of ZnO particles into materials. For example, mention may be made here of the finishing of polymers (plastics) with zinc oxide during an extrusion step or the preparation of solid or liquid cosmetic formulations comprising zinc oxide.

Preferably, in the course of the process according to the invention, in step c., the optional further effect substances used are UV absorbers or free-radical scavengers.

In a preferred embodiment of the process according to the invention, the optional further effect substances used are compounds of the general formula (I) or (II):

Y'—Z    (I)

or

Y—Z    (II).

Preferably, the further effect substances obey the formula Y'—Z. Here, Y' denotes a chemical structural unit (linker) via which, if appropriate after a chemical reaction of Y' to Y, the further effect substances interact with the modified ZnO particles, Z denotes a functional group of the further effect substance. For example, the chemical reaction of the linker Y' to the linker Y takes place by hydrolysis. The further effect substances can of course also have two or more linkers (Y or Y') or two or more functional groups Z.

In a preferred embodiment of the process according to the invention, the further effect substances of the compounds of the general formula (I) or (II) are used directly as surface-active substances in step b.

The type of interaction between Y' or Y with the modified ZnO particles can be very different for different Y and Y', as described above. For example, the linker can be covalently bonded to the ZnO particles. Furthermore, an electrostatic (ionic) interaction, an interaction via dipole-dipole forces or via hydrogen bridge bonds is also possible. Preferably, the linker interacts covalently or electrostatically with the ZnO particle. The linker can of course also interact with the ZnO particle at two or more sites, for example form two or more covalent bonds, or, besides a covalent attachment, also have further interactions with the ZnO particle, for example via hydrogen bridges.

For example, the linker —Y— in the case of a covalent interaction corresponds to

 (L1)

 (L2)

 (L3)

 (L4)

 (L5)

 (L6)

 (L13)

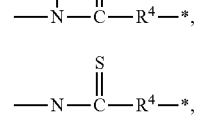

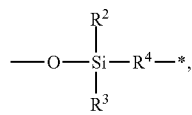
(L14)

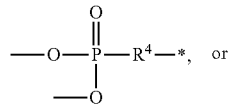
(L19)

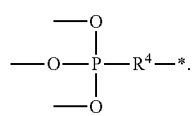
(L20)

("*" corresponds to the bonding to the functional group Z)

Here,

R$^1$ is H, C$_1$-C$_{20}$-alkyl, aryl, arylalkyl, heterocycles, C$_1$-C$_{20}$-alkylcarbonyl, R$^2$, R$^3$ independently of one another are OH, C$_1$-C$_{20}$-alkoxy, C$_1$-C$_{20}$-alkyl, aryl, arylalkyl, heterocycles, R$^4$ is a chemical single bond, O, C$_1$-C$_{20}$-alkylene, C$_1$-C$_{20}$-alkylene-R$^5$, R$^5$ is O, N, S, N(R$^6$)—C=O, N—CO$_2$, O$_2$C, CO$_2$, O$_2$CN, OCO$_2$,

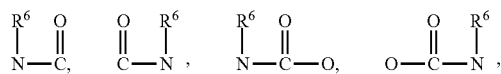

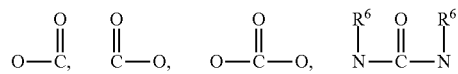

R$^6$ is H, C$_1$-C$_{20}$-alkyl,

R$^7$ is H, metal cation, where the substitutents R$^1$ to R$^4$ and/or R$^6$ may in each case be interrupted at any desired position by one or more heteroatoms, where the number of these heteroatoms is not more than 10, preferably not more than 8, very particularly preferably not more than 5 and in particular not more than 3, and/or may in each case be substituted at any desired position, but not more than five times, preferably not more than four times and particularly preferably not more than three times, by C$_1$-C$_{20}$-alkyl, C$_1$-C$_{20}$-alkoxy, aryl, aryloxy, heterocycles, heteroatoms or halogen, where these can likewise be substituted a maximum of twice, preferably a maximum of once, by the specified groups. Metal cations are here preferably mono-, di- or trivalent metal cations, for example alkali metal, alkaline earth metal, earth metal, transition metal cations. In particular, metal cations are Li$^+$, Na$^+$, K$^+$, Ca$^{2+}$ and/or Mg$^{2+}$. For the valency of the metal cations, it should naturally be taken into consideration that electroneutrality is still ensured overall. For example, a divalent metal cation neutralizes two linkers L10. A formation of ionic interactions, for example salt bridges, between linkers L10 is possible.

Preferred linkers —Y— are L1, L5, L8, L10 or L14.

Preferred silane linkers L14 are

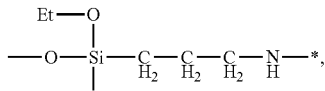
(L15)

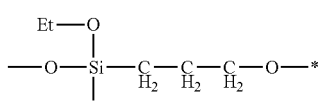
(L16)

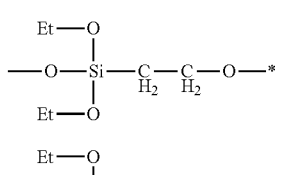
(L17)

(L18)

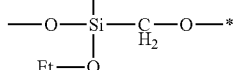

(* symbolizes the bonding site to the functional group Z) or (partially) hydrolyzed derivatives of these silane linkers L15, L16, L17 or L18.

In one embodiment of the modified ZnO particles, the further effect substances interact not only with the modified ZnO particles, but also with one another. For example, the further effect substances can interact with one another via electrostatic interactions or hydrogen bridge bonds with one another. It is likewise possible that the further effect substances react with one another in a chemical reaction, before or after a possible chemical reaction with the ZnO particles. For example, this is possible in the form of a crosslinking reaction between the further effect substances. Preferably, such a crosslinking takes place if the further effect substances carry silane groups which are capable of condensation reactions. The crosslinking reaction can, if the further effect substances are located on the surface of the modified ZnO particles, lead to the formation of a completely crosslinked coating, or else also produce only partially crosslinked areas on the surface.

The functional group Z of the further effect substance can be very different depending on the use of the modified ZnO particles.

For example, the functional group Z comprises a polymerizable group, for example an unsaturated bond. Thus, modified ZnO particles can be incorporated into a polymer as "monomers" with the help of a polymerization reaction, for example free-radically or ionically. Suitable as such polymerizable groups are, for example, methacrylates, acrylates, acrylamides, cyanoacrylamides, styrene, substituted styrenes, amines, alcohols, urethanes.

For example, the functional group Z comprises a chromophore which can absorb electromagnetic radiation. Such a chromophore is, for example, able to absorb IR, visible, or UV light. For example, such a chromophore can then emit the absorbed light again, if appropriate at another wavelength (fluorescence or phosphorescence), or else give off the absorbed light energy in a nonradiative manner. Furthermore, combined processes of emission and nonradiative deactivation are also possible.

Furthermore, besides UV absorbers, the functional group Z comprises, for example, stabilizers, for example for organic polymers, e.g. free-radical scavengers, antioxidants, auxiliaries for organic polymers, flame retardants, organic dyes, or IR dyes, fluorescent dyes, optical brighteners, antistatic agents, antiblocking agents, antifogging agents, nucleating agents, biocides, pesticides, fungicides or herbicides.

Preferably, the functional group Z comprises a chromophore which absorbs UV light with a wavelength of less than 400 nm, in particular from 200 to 400 nm (UV absorber). A chromophore of this type can therefore absorb, for example, UV-A (from 320 to 400 nm), UV-B (from 290 to 319 nm) and/or UV-C (from 200 to 289 nm) light. Preferably, the chromophore absorbs UV-A and/or UV-B light. Very particularly preferably, the chromophore absorbs UV-A and/or UV-B light and deactivates the absorbed light energy in a nonradiative manner.

For example, the functional group Z corresponds to

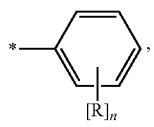
(Z1)

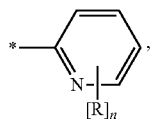
(Z2)

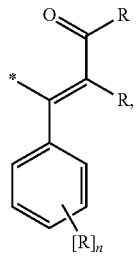
(Z3)

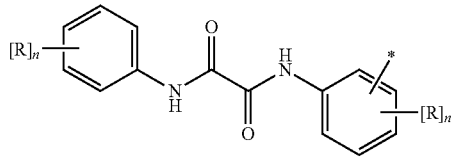
(Z4)

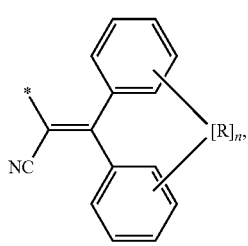
(Z5)

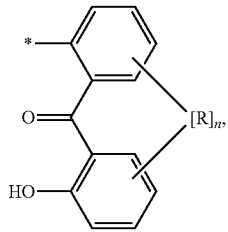
(Z6)

-continued

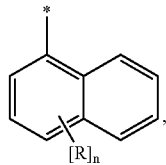
(Z7)

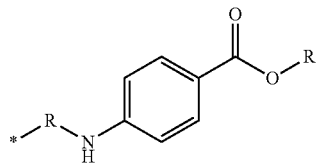
(Z8)

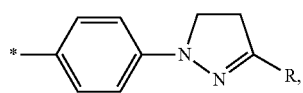
(Z9)

(Z10)

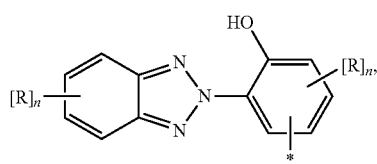
(Z11)

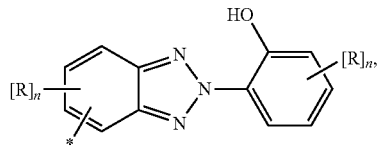
(Z12)

(Z13)

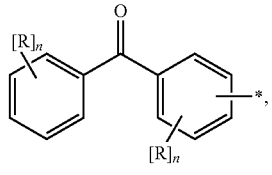
(Z14)

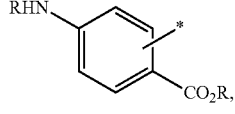
(Z15)

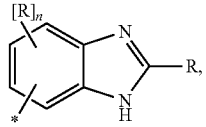
(Z16)

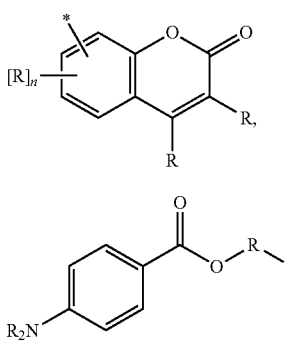

(Z17)

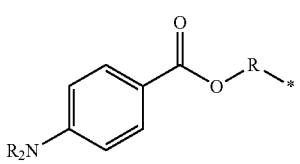

(Z18)

where
R is halogen, hydroxy, phenyl, $C_1$-$C_{20}$-alkyl, hydroxyphenyl, $C_1$-$C_{20}$-alkoxy, aryl, aryloxy, amino, mono- or dialkylamino, nitrile, carboxylate, ester, thiol, sulfoxides, sulfonic acid, acyl, formyl, carbonyloxyalkyl, carbonylaminoalkyl,
n is an integer from the range from 0 to 4,
and the n substituents R, independently of one another, may be identical or different, and where the substituent R can be interrupted at any desired position by one or more heteroatoms, where the number of these heteroatoms is not more than 10, preferably not more than 8, very particularly preferably not more than 5 and in particular not more than 3, and/or can in each case be substituted at any desired position, but not more than five times, preferably not more than four times and particularly preferably not more than three times, by $C_1$-$C_{20}$-alkyl, $C_1$-$C_{20}$-alkoxy, aryl, aryloxy, heterocycles, heteroatoms or halogen, where these can likewise be substituted a maximum of twice, preferably a maximum of once, by the specified groups.

Preferably, the modified ZnO particles comprising UV absorbers absorb light with a wavelength from the range from 200 to 600 nm. Furthermore, the absorption spectrum of the particles according to the invention preferably has at least one absorption maximum in the wavelength range from 200 to 600 nm, in particular from 250 to 400 nm. Preferably, modified ZnO particles according to the invention absorb UV-A and/or UV-B light. Very particularly preferably, the ZnO particles according to the invention absorb UV-A and/or UV-B light and deactivates the absorbed light energy in a nonradiative manner.

The UV absorbers used are preferably those further effect substances which have a linker Y or Y'.

UV Absorbers are often commercial products. They are sold, for example, under the tradename Uvinul® by BASF SE, Ludwigshafen. The Uvinul® photoprotective agents comprise compounds of the following classes: benzophenones, benzotriazoles, cyanoacrylates, cinnamic acid esters, para-aminobenzoates, naphthalimides. Moreover, further known chromophores are used, e.g. hydroxyphenyltriazines or oxalanilides. Such compounds are used, for example, on their own or in mixtures with other photoprotective agents in cosmetic applications, for example sunscreen compositions or for the stabilization of organic polymers. Further examples of UV absorbers are:
substituted acrylates, such as, for example, ethyl or isooctyl α-cyano-β,β-diphenyl acrylate (principally 2-ethylhexyl α-cyano-β,β-diphenylacrylate), methyl α-methoxycarbonyl-β-phenylacrylate, methyl α-methoxycarbonyl-β-(p-methoxyphenyl)acrylate, methyl or butyl α-cyano-β-methyl-β-(p-methoxyphenyl)acrylate, N-(β-methoxycarbonyl-β-cyanovinyl)-2-methylindoline, octyl p-methoxycinnamate, isopentyl 4-methoxycinnamate, urocaninic acid or salts or esters thereof;
derivatives of p-aminobenzoic acid, in particular esters thereof, e.g. ethyl 4-aminobenzoate or ethoxylated ethyl 4-aminobenzoate, salicylates, substituted cinnamic acid esters (cinnamates) such as octyl p-methoxycinnamate or 4-isopentyl 4-methoxycinnamate, 2-phenylbenzimidazole-5-sulfonic acid or its salts;
2-hydroxybenzophenone derivatives, such as, for example, 4-hydroxy-, 4-methoxy, 4-octyloxy-, 4-decyloxy-, 4-dodecyloxy-, 4-benzyloxy-, 4,2',4'-trihydroxy-, 2'-hydroxy-4,4'-dimethoxy-2-hydroxybenzophenone, and 4-methoxy-2-hydroxybenzophenonesulfonic acid sodium salt;
esters of 4,4-diphenylbutadiene-1,1-dicarboxylic acid, such as, for example, the bis(2-ethylhexyl) ester;
2-phenylbenzimidazole-4-sulfonic acid, and 2-phenylbenzimidazole-5-sulfonic acid or salts thereof;
derivatives of benzoxazoles;
derivatives of benzotriazoles or 2-(2'-hydroxyphenyl)benzotriazoles, such as, for example, 2-(2H-benzotriazol-2-yl)-4-methyl-6-(2-methyl-3-((1,1,3,3-tetramethyl-1-(trimethylsilyloxy)disiloxanyl)propyl)phenol, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-[2'-hydroxy-5'-(1,1,3,3-tetramethylbutyl)phenyl]benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-[3',5'-bis(α,α-dimethylbenzyl)-2'-hydroxyphenyl]benzotriazole, 2-[3'-tert-butyl-2'-hydroxy-5'-(2-octyloxycarbonylethyl)phenyl]-5-chlorobenzotriazole, 2-[3'-tert-butyl-5'-(2-(2-ethylhexyloxy)carbonylethyl)-2'-hydroxyphenyl]-5-chlorobenzotriazole, 2[3'-tert-butyl-2'-hydroxy-5'-(2-methoxycarbonylethyl)phenyl]-5-chlorobenzotriazole, 2-[3'-tert-butyl-2'-hydroxy-5'-(2-methoxycarbonylethyl)phenyl]benzotriazole, 2-[3'-tert-butyl-2'-hydroxy-5'-(2-octyloxycarbonylethyl)phenyl]benzotriazole, 2-[3'-tert-butyl-5'-(2-(2-ethylhexyloxy)carbonylethyl)-2'-hydroxyphenyl]benzotriazole, 2-(3'-dodecyl-2'-hydroxy-5'-methylphenyl)benzotriazole, 2-[3'-tert-butyl-2'-hydroxy-5'-(2-isooctyloxycarbonylethyl)phenyl]benzotriazole, 2,2'-methylenebis[4-(1,1,3,3-tetramethylbutyl)-6-benzotriazol-2-ylphenol], the completely esterified product of 2-[3'-tert-butyl-5'-(2-methoxycarbonylethyl)-2'-hydroxyphenyl]-2H-benzotriazole with polyethylene glycol 300, [R—CH2CH2-COO (CH2)3-]2 where R is 3'-tert-butyl-4-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole;
benzylidenecamphor or its derivatives, as are specified, for example, in DE-A 38 36 630, e.g. 3-benzylidenecamphor, 3(4'-methylbenzylidene)-d-1-camphor;
α-(2-oxoborn-3-ylidene)toluene-4-sulfonic acid or its salts, N,N, N-trimethyl-4-(2-oxoborn-3-ylidenemethyl) anilinium monosulfate;
dibenzoylmethanes, such as, for example, 4-tert-butyl-4'-methoxydibenzoylmethane;
2,4,6-triaryltriazine compounds, such as 2,4,6-tris{N[4-(2-ethylhex-1-yl)oxycarbonylphenyl]amino}-1,3,5-triazine, bis(2'-ethylhexyl) 4,4'-((6-(((tert-butyl)aminocarbonyl)phenylamino)-1,3,5-triazine-2,4-diyl)imino)benzoate;

2-(2-hydroxyphenyl)-1,3,5-triazines, such as, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazin, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4(2-hydroxy-3-dodecyloxypropoxy)phenyl]4,6-bis(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxy-phenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Further suitable UV absorbers can be found in the publication Cosmetic Legislation, vol. 1, Cosmetic Products, European Commission 1999, pp. 64-66, to which reference is hereby made.

Furthermore, suitable UV absorbers are described in lines 14 to 30 ([0030]) on page 6 of EP 1 191 041 A2. Reference is made to the entire contents of this and this literature reference is made part of the disclosure content of the present invention.

Particularly preferred UV absorbers are substituted cinnamic acids, benzophenones, benzotriazoles, aminobenzoic acids. Very particular preference is given to compounds of the general formula (III)-(XIII), which can if appropriate be further substituted with substituents R.

(III)
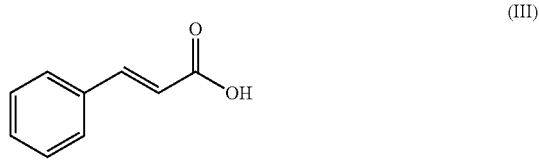

(IV)
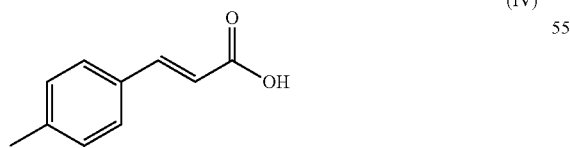

(V)
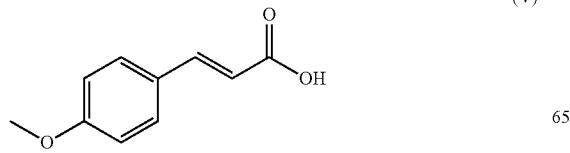

-continued (VI)
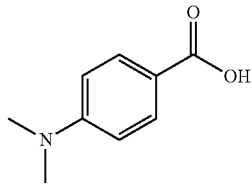

(VII)
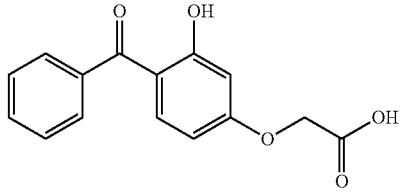

(VIII)
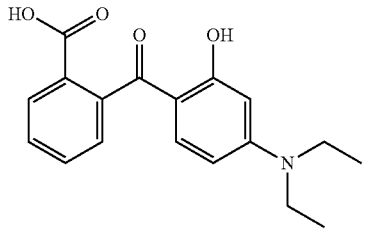

(IX)
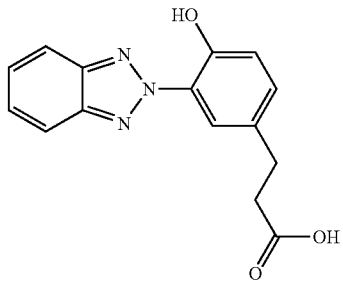

(X)
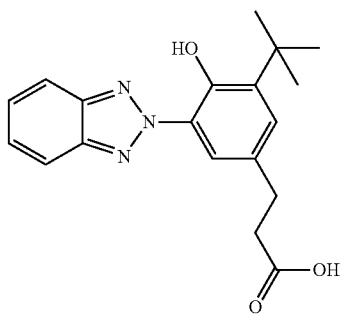

(XI)
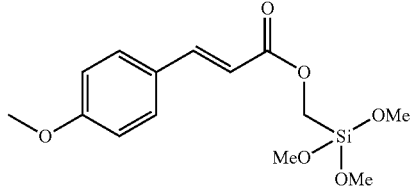

(XII)
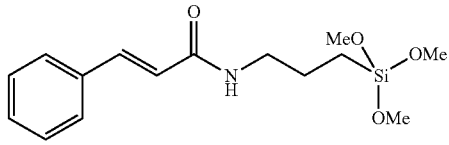

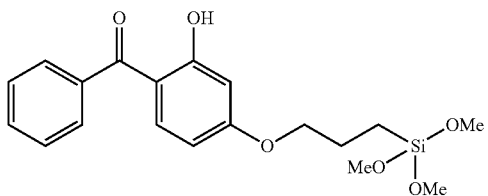
(XIII)

The invention further provides modified ZnO particles prepared according to the invention which comprise UV absorbers of the formulae (III)-(XIII) as further effect substances.

According to the invention, therefore, it is possible to use modified ZnO particles which comprise UV absorbers as further effect substances for the stabilization of materials, in particular polymers (plastics), coatings or paints, in particular of plastics, against the effect of UV light.

The present invention further provides a method for the stabilization of materials, in particular polymers, against the effect of light, free radicals or heat, where modified ZnO particles which comprise light-absorbing compounds, for example UV absorbers and/or stabilizers, for example HALS compounds, as further effect substances are added to the materials, in particular polymers. Furthermore, in this way it is also possible to stabilize coatings or paints against the effect of light, free radicals or heat.

The present invention further provides materials, in particular polymers, which comprise modified ZnO particles prepared according to the invention.

The invention further provides the use of modified ZnO particles which comprise light-absorbing compounds, for example UV absorbers and/or stabilizers, for example HALS compounds, as further effect substances for the stabilization of polymers against the effect of light, free radicals or heat.

The incorporation of the modified ZnO particles comprising further effect substances into materials takes place analogously to known methods for the incorporation of ZnO particles into materials. For example, mention may be made here of the finishing of polymers (plastics) by ZnO during an extrusion step or the preparation of cosmetic formulations comprising zinc oxide.

The modified ZnO particles prepared according to the invention and comprising UV absorbers as effect substances have the advantage that their tendency toward migration in materials, in particular in polymers, is very low. In contrast to conventional organic UV absorbers, therefore, the physical loss (loss through migration) of the absorbers during use is also small.

Furthermore, suitable further effect substances are stabilizers for inanimate organic polymers. The stabilizers are compounds which stabilize organic polymers against degradation upon the action of oxygen, light (visible, infrared and/or ultraviolet light) or heat. They are also referred to as antioxidants or as photostabilizers, cf. Ullmanns, Encyclopedia of Industrial Chemistry, vol. 3, 629-650 (ISBN-3-527-30385-5) and EP-A 1 110 999, page 2, line 29 to page 38, line 29. Using such stabilizers it is possible to stabilize virtually all organic polymers, cf. EP-A 1 110 999, page 38, line 30 to page 41, line 35. This literature reference is made part of the disclosure content of the present invention by reference. The stabilizers described in the EP application belong to the compound class of the pyrazolones, of the organic phosphites or phosphonites, of the sterically hindered phenols and of the sterically hindered amines (stabilizers of the so-called HALS type or HALS stabilizers, cf. Römpp, 10th edition, volume 5, pages 4206-4207. According to the invention, therefore, modified ZnO particles which comprise stabilizers as further effect substances can be used for the stabilization of polymers. The stabilizers used are preferably those further effect substances which have a linker or Y or Y'.

For example, the quantitative ratio (weight) of UV absorbers to stabilizers is from 10:1 to 1:10, preferably from 5:1 to 1:5, in particular from 2:1 to 1:2. UV absorbers/HALS ratios are preferably selected from the range from 1:2 to 2:1.

In a preferred embodiment, mixtures of modified ZnO particles which comprise, as further effect substances, UV absorbers and certain auxiliaries for organic polymers are used. For example, these auxiliaries are flame retardants, organic dyes, IR dyes, fluorescent dyes, optical brighteners, nucleating agents, antimicrobial additives, pesticides, fungicides or herbicides. Depending on the field of application, the ratio of auxiliaries to UV absorbers can vary greatly. For example, the ratio of UV absorbers to auxiliaries is from 10:1 to 1:10, preferably from 5:1 to 1:5, in particular from 2:1 to 1:2. The further effect substances used here are preferably those which have a linker Y or Y'.

Furthermore, suitable further effect substances are auxiliaries for organic polymers. Auxiliaries are to be understood as meaning, for example, substances which at least largely prevent the fogging of films or molded parts made of plastics, so-called antifogging agents. Furthermore suitable as polymer additives are antifogging agents for organic polymers from which in particular disks or films are produced. Such polymer additives are described, for example, by F. Wylin, in Plastics Additives Handbook, 5th edition, Hanser, ISBN 1-56990-295-X, pages 609-626. According to the invention, therefore, modified ZnO particles which comprise auxiliaries as further effect substances can be used as antifogging agents.

The auxiliaries used are preferably those further effect substances which have a linker Y or Y'.

Further suitable substances effect are lubricant, such as oxidized polyethylene waxes, and antistats for organic polymers. Examples of antistats cf. the literature reference specified above F. Wylin, Plastics Additives Handbook, pages 627-645.

Further suitable further effect substances are flame retardants, which are described, for example, in Römpp, 10th edition, pages 1352 and 1353 and also in Ullmanns, Encyclopedia of Industrial Chemistry, vol. 14, 53-71. According to the invention, therefore, modified ZnO particles which comprise flame retardants as further effect substances can be used as flame retardants for polymers. The flame retardants used are preferably those effect substances which have a linker Y or Y'.

Standard commercial stabilizers and auxiliaries are sold, for example, under the trade names Tinuvin®, Chimassorb®, and Irganox® by Ciba, Cyasorb® and Cyanox® by Cytec, Lowilite®, Lowinox®, Anox®, Alkanox®, Ultranox® and Weston® by Chemtura and Hostavin® and Hostanox® by Clariant. Stabilizers and auxiliaries are described, for example, in Plastics Additives Handbook, 5th edition, Hanser Verlag, ISBN 1-56990-295-X. The standard commercial stabilizers and auxiliaries used are preferably those further effect substances which have a linker Y or Y'.

Other further effect substances are organic dyes which absorb light in the visible region, or optical brighteners. Such dyes and optical brighteners are described in detail, for example in WO 99/40123, page 10, line 14 to page 25, line 25, to which reference is hereby expressly made. Whereas organic dyes have an absorption maximum in the wavelength range from 400 to 850 nm, optical brighteners have one or more absorption maxima in the range from 250 to 400 nm. As is known, upon irradiation with UV light, optical brighteners emit fluorescent radiation in the visible region. Examples of optical brighteners are compounds from the classes of bis-styrylbenzenes, stilbenes, benzoxazoles, coumarins, pyrenes and naphthalenes. Standard commercial optical brighteners are sold under the names Tinopal®, Uvitex® (both by Ciba Speciality Chemicals), Ultraphor® (BASF SE) and Blankophor® (Bayer). Moreover, optical brighteners are described in Römpp, 10th edition, volume 4, 3028-3029 (1998) and in Ullmanns, Encyclopedia of Industrial Chemistry, vol. 24, 363-386 (2003). According to the invention, therefore, modified ZnO particles which comprise organic dyes or brighteners as further effect substances can be used for the dyeing or brightening of polymers. The organic dyes or brighteners used are preferably those further effect substances which have a linker Y or Y'.

Further suitable further effect substances are IR dyes which are sold, for example, by BASF SE as Lumogen® IR. Lumogen® dyes comprise compounds of the classes of perylenes, naphthalimides, or quaterylenes. According to the invention, therefore, modified ZnO particles which comprise IR dyes as further effect substances can be used as IR absorbers for polymers or for the invisible marking of polymers. The IR dyes used are preferably those further effect substances which have a linker Y or Y'.

The modified ZnO particles according to the invention can of course be further modified on their surface subsequently using methods known from the prior art, or the further effect substances can be further reacted chemically.

In one embodiment of the process according to the invention, mixtures of different further effect substances can be used (step c.), where the further effect substances can contain different functional groups Z. The further effect substances used in the mixture are those which have a linker Y or Y'. The mixture of different further effect substances can either be prepared before the addition, or else be produced through the respective addition of the further effect substances. The addition of the further effect substances can take place here simultaneously or staggered, overlapping or successively. Preferably, with the help of the process according to the invention, it is possible to prepare modified ZnO particles comprising further effect substances with different Z, where the further effect substances are added successively (step c.). The modified ZnO particles according to the invention prepared with further effect substances with different Z generally have combined properties based on the different Z. For example, ZnO particles modified in this way can be prepared which comprise different UV absorbers, and thus cover the entire required absorption spectrum. Further combinations of functional groups are, for example, flame retardants with dyes or UV absorbers with flame retardants. Further combinations can be selected depending on the desired area of application. Such combinations often exhibit synergies.

The solids content of the suspensions prepared according to the invention comprising modified ZnO particles or liquid formulations is determined in a first approximation through the modified ZnO particles according to the invention and varies within a wide range depending on the application. As a rule, the solids content is in the range from 1 to 90% by weight and in particular in the range from 5 to 70% by weight, based on the total weight of the liquid formulation or of the suspension prepared according to the invention.

The liquid formulations according to the invention or the suspensions prepared according to the invention can be directly used as such or following concentration or dilution. Furthermore, the liquid formulations according to the invention can also comprise customary additives, e.g. additives that change the viscosity (thickeners), antifoams, bactericides, agents to protect against frost and/or protective colloids. The protective colloids may either be anionic, nonionic, cationic, or zwitterionic in nature.

In addition, the liquid formulations according to the invention or the suspensions prepared according to the invention can be formulated with conventional binders, for example aqueous polymer dispersions, water-soluble resins or with waxes.

The modified ZnO particles according to the invention are present in the liquid formulations and can also be obtained in powder form from these liquid formulations by removing the volatile constituents of the liquid phase. Within the powder, the particles according to the invention can either be present singly, in agglomerated form, or else partially in filmed form. The powders according to the invention are accessible here, for example by evaporating the liquid phase, freeze-drying or by spray-drying.

Liquid formulations according to the invention are often accessible by redispersing the powders according to the invention, for example in a nonpolar solvent.

Solid formulations according to the invention comprise the modified ZnO particles in varying concentration depending on the application. As a rule, the fraction of the modified ZnO particles is in the range from 0.1% 50% by weight and in particular in the range from 0.5 to 20% by weight, based on the total weight of the solid formulation.

For example, the solid formulations are a mixture of the modified ZnO particles according to the invention in a polymeric carrier material, e.g. polyefins (e.g. polyethylene of low or high density, polypropylene), styrene homo- or copolymers, polymers of chlorinated alkenes (e.g. polyvinyl chloride), polyamides, polyesters (e.g. polyethylene or polybutylene terephthalate), polycarbonates or polyurethanes.

Solid formulations according to the invention are also mixtures of the modified ZnO particles with relatively low molecular weight matrices, e.g. polyethylene waxes.

To prepare the solid formulation, the modified ZnO particles can be introduced into the molten matrix, for example by dispersion at elevated temperature, in which case the solid formulation is formed upon cooling.

The solid formulation can, if appropriate, also comprise auxiliaries which improve the distribution of the modified ZnO particles in the solid matrix (dispersants). For example, waxes can be used for this purpose.

The solid formulations can be used undiluted or following dilution to the use concentration.

Solid formulations are, for example, the formulations obtained after removing the volatile constituents of the liquid formulations described above. These are generally mixtures/dispersions of modified ZnO particles with/in polymers or oligomers (in the masterbatch, in waxes, e.g. Luwax® from BASF SE), which are in the form of powders or waxes.

The solid or liquid formulations according to the invention and the powders according to the invention obtainable therefrom by separating off the liquid phase have the advantage that they comprise modified ZnO particles and the further effect substances in migration-stable form controlled over a long period, i.e. the further effect substances are associated with the modified ZnO particles over a prolonged period and are not released to the surroundings outside of the formulations. The modified ZnO particles and/or the further effect substances are thus present in a form which is particularly advantageous for their application. This fact applies in particular for those solid or liquid formulations or particle powders which comprise a UV absorber. The migration stability can be measured, for example, through spray-drying the liquid formulation and subsequent extraction of the powder, e.g. with tetrahydrofuran (THF), by determining the fraction of the further effect substances recovered by extraction.

The modified ZnO particles according to the invention in the form of their solid or liquid formulations or powders are preferably used for the finishing, for example for the stabilization, in particular against UV radiation, of organic polymers. For this purpose, the particles can be incorporated into the organic polymers either as solid or liquid formulation, or else as powder by the customary methods. Mention is to be made, for example, of the mixing of the particles with the organic polymers before or during an extrusion step.

After incorporating the modified ZnO particles according to the invention into the organic polymers, the particles are present in the polymer matrix and the further effect substances are present according to the invention in the organic polymers in migration-stable form. The migration stability can be applied analogously to the method given above (extraction with THF) for particle powders also to polymer powders which comprise modified ZnO particles. Furthermore, the migration stability can be tested by optical determination. For this, films are prepared from the organic polymers comprising the modified ZnO particles, for example by extrusion, said films being stored at elevated temperature (e.g. 60° C.). After a certain period, for example one to two weeks, it can be established through an optical test whether the particles have migrated to the surface of the films (formation of visible deposits).

Furthermore, the migration can be tested by bringing a plastic film which comprises the modified ZnO particles to be investigated (mother film) into close contact with one or more films made of the same material but without modified ZnO particles (daughter film). This film stack is stored at elevated temperature and the concentration of the modified ZnO particle to be investigated in the mother and daughter films is measured.

Inanimate organic polymers are to be understood here as meaning any plastics, preferably thermoplastic materials, in particular films, fibers or moldings of any configuration. Within the context of this application, these are also simply referred to as organic polymers. Further examples of the finishing or stabilization of organic polymers with polymer additives can be found in the Plastics Additives Handbook, 5th edition, Hanser Verlag, ISBN 1-56990-295-X. The organic polymers are preferably polyolefins, in particular polyethylene or polypropylene, polyamides, polyacrylonitriles, polyacrylates, polymethacrylates, polycarbonates, polystyrenes, copolymers of styrene or methylstyrene with dienes and/or acryloyl derivatives, acrylonitrile-butadiene-styrenes (ABS), polyvinyl chlorides, polyvinyl acetals, polyurethanes or polyesters. Organic polymers may also be copolymers, mixtures or blends of the above-mentioned polymers. Particularly preferred polymers are polyolefins, in particular polyethylene or polypropylene.

In order to stabilize a thermoplastic polymers against the effect of UV, the procedure may, for example, involve initially melting the polymer in an extruder, incorporating into the polymer melt, at a temperature of, for example, 180 to 200° C., a particle powder with modified ZnO particles comprising UV absorbers and prepared according to the invention, and preparing from this granules from which, by known methods, films, fibers or moldings are then produced which are stabilized against the effect of UV radiation.

The amount of modified ZnO particles in the polymer which suffices to stabilize the polymer can vary over a wide range depending on the modified ZnO particle or intended use. Preferably, the stabilized polymers comprise from 0.1 to 10% by weight of the modified ZnO particles, based on the total weight of the mixture, very particularly preferably from 0.5 to 5.0% by weight.

Within the context of the use according to the invention, mixtures of different modified ZnO particles according to the invention can also naturally be used. The modified ZnO particles of these mixtures can have identical or different compositions and size distributions. For example, modified ZnO particles comprising UV absorbers can also be used together with other modified ZnO particles according to the invention which comprise, for example, stabilizers for organic polymers such as antioxidants for the stabilization of organic polymers and coats of paints.

In a further use according to the invention, the ZnO particles according to the invention can be used as catalysts or as constituent of catalysts, for example for dehydrogenation or steam reformation (cf. WO 2001/005499).

In a further use according to the invention, the ZnO particles according to the invention can be used for ZnO-based semiconductive films, in thin-film transistors (WO2006/138071, WO 2006/138072).

Also of industrial interest are, for example, those liquid formulations according to the invention or the powders obtained therefrom by, for example, spray-drying, which comprise modified ZnO particles according to the invention which comprise at least one antioxidant, for example phenolic compounds, such as, for example, pentaerythritol tetrakis[3-(3',5'-di-tert-butyl-4'-hydroxyphenyl)propionate] (obtainable for example as Irganox® 1010 from Ciba S.C.). Also of interest are particle powders which comprise at least one antistatic for organic polymers or an antifogging agent for organic polymers or a colorant for organic polymers.

Preference is given to solid or liquid formulations according to the invention which comprise UV absorbers and stabilizers.

For the use for the finishing, for example for the stabilization, of organic polymers, the modified ZnO particles according to the invention can also be used together with other additive systems in order to improve the overall effectiveness. For example with conventional emulsion concentrates, suspension concentrates, suspoemulsion concentrates of polymer additives. By mixing the modified ZnO particles according to the invention with conventional preparations of the aforementioned polymer additives, firstly a broadening of the activity spectrum is achieved if the conventional preparation comprises polymer additives other than the particles according to the invention. Secondly, the advantages of the modified ZnO particles according to the invention do not become lost through the formulation with conventional polymer additive preparations, in particular the improved migration stability. Consequently, the application properties of a conventional polymer additive preparation can be improved through formulation with modified ZnO particles according to the invention which comprise comparable polymer additives. In particular, on account of the improved migration stability, it is possible, while retaining the same effectiveness, to reduce the amount of additives used.

In a preferred embodiment, the modified ZnO particles according to the invention are used together with further stabilizers for stabilizing polymers. In particular, the further stabilizers used here are UV absorbers, antioxidants, sterically hindered amines, nickel compounds, metal deactivators, phosphites, phosphonites, hydroxylamines, nitrones, amine oxides, benzofuranones, indolinones, thiosynergists, peroxide-destroying compounds or basic costabilizers.

The amount of further stabilizers in the polymer can vary over a wide range depending on the stabilizer or intended use. Preferably, the stabilized polymers comprise from 0.01 to 2% by weight of the further stabilizers, based on the total weight of the mixture, very particularly preferably 0.05 to 1.0% by weight.

The liquid formulations according to the invention are associated with a series of further advantages. Firstly, they are stable formulations of the modified ZnO particles, for example of polymer additives. In particular, the phase separation problems observed with other formulations and also in the case of micro- or nanodispersions of the polymer additives, and settling of the polymer additive are not observed, even in the case of the use of drastic conditions as sometimes arise during the finishing of organic polymers with polymer additives. The washing-out of the polymer additive from the treated organic polymer upon the action of water is significantly reduced compared to other formulations. Furthermore, interactions of the polymer additives with other formulation constituents or copolymer additives, as often arise during conventional formulation, are not observed. Moreover, degradation of the polymer additives through substrate or environmental influences, such as pH of the medium or UV radiation, is slowed or completely suppressed altogether. Reduced effectiveness of the polymer additives as a result of being bound into a polymer matrix is surprisingly generally not observed.

The invention further provides the use of modified ZnO particles comprising, as further effect substances, UV absorbers which can be used as UV absorbers in dermatological and cosmetic applications. Preference is given to use in sunscreen compositions. Cosmetic or dermatological compositions which comprise UV-absorbing modified ZnO particles can be present in the form of an emulsion, a dispersion, a suspension, an aqueous surfactant preparation, a milk, a lotion, a cream, a balsam, an ointment, a gel, granules, a powder, a stick preparation, a foam, an aerosol or a spray. These compositions are prepared by methods of the prior art known to the person skilled in the art by mixing the individual components. Furthermore, these compositions can comprise further UV photoprotective filters, pigments, vitamins, skin moisturizers, antioxidants, antimicrobial active ingredients, deodorizing or antiperspirant substances and/or auxiliaries and additives different from the modified ZnO particles.

The preparation method of the modified ZnO particles according to the invention permits a very efficient and controlled access to the particles. The modified ZnO particles according to the invention are present, for example, as constituents of liquid formulations or of powders and can be readily incorporated into organic polymers.

The modified ZnO particles according to the invention are particularly suitable for the finishing, for example against static charging or fogging, and/or stabilization, for example against oxidation, effect of UV rays, heat and/or light, of organic polymers.

The examples below are intended to illustrate the invention but without limiting it.

EXAMPLES

Example 1

Precipitation of ZnO from $ZnCl_2$ and NaOH in isopropanol and subsequent modification with oleic acid in toluene

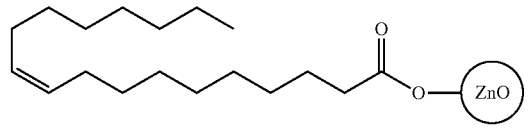

Firstly, solutions 1 and 2 were prepared at 75° C. Solution 1 comprised 13.6 g (0.1 mol) of zinc chloride (Riedel de Haen) in 500 ml of isopropanol. Solution 2 comprised 8.0 g (0.2 mol) of sodium hydroxide (Riedel de Haen) in 500 mL of isopropanol. Solution 2 was metered into solution 1 with stirring. The resulting reaction mixture was then afterstirred for 60 minutes at 75° C. The resulting white suspension was cooled to room temperature and transferred to a rotary evaporator flask. Isopropanol was then distilled off at 70° C. and a pressure of ca. 150 mbar. The residue was dispersed in 1 l of toluene at 40° C. 7 g (0.025 mol) of oleic acid (Riedel de Haen) were then added. The resulting mixture was heated to 70° C. and held at this temperature for 4 hours. The ZnO-comprising, transparent suspension was separated from solid NaCl in a separating funnel and concentrated in a rotary evaporator.

The Na analysis of the suspension obtained revealed an Na content of 0.013 g/100 g and a Zn content of 2.1 g/100 g. This corresponds to an NaCl/ZnO ratio of ca. 0.013. Using DLS measurements (Malvern Instruments), an average particle size of ca. 12 nm was determined (D100<30 nm). Determination of the particle size using TEM produced an average particle size of 10 nm. Using SAD (Selected Area Diffraction) it was possible to demonstrate that it is actually ZnO particles.

Example 2

Precipitation of ZnO from $ZnCl_2$ and NaOH in isopropanol and subsequent modification with 4-amyloxycinnamic acid in toluene

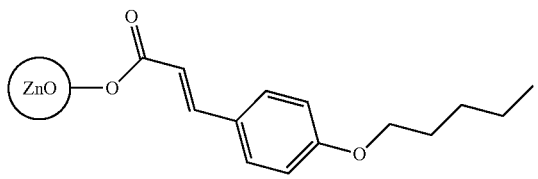 [SMILES: "ZnO" ; CCCCCOc1ccc(/C=C/C(=O)OC)cc1]

Firstly, solutions 1 and 2 were prepared at 75° C. Solution 1 comprised 13.6 g (0.1 mol) of zinc chloride (Riedel de Haen) in 500 mL of isopropanol. Solution 2 comprised 8.0 g (0.2 mol) of sodium hydroxide (Riedel de Haen) in 500 mL of isopropanol. Solution 2 was metered into solution 1 with stirring. The resulting reaction mixture was then afterstirred for 60 minutes at 75° C. The resulting white suspension was cooled to room temperature and transferred to a rotary evaporator flask. Isopropanol was then distilled off at 70° C. and a pressure of ca. 150 mbar.

Some of the residue (29.8 g comprising 0.025 mol of ZnO) was dispersed in 200 mL of toluene at 40° C. 0.6 g (0.00375 mol) of 4-amyloxycinnamic acid (Acros) was then added. The resulting mixture was heated to 70° C. and held at this temperature for 4 hours. The ZnO-comprising, slightly cloudy suspension was separated off from solid NaCl in a separating funnel.

Measurement of the UV spectrum revealed a $\lambda_{max}$ (toluene): 294 nm

Example 3

Precipitation of ZnO from $ZnCl_2$ and NaOH in Isopropanol and Subsequent Modification with a Mixture of Oleic Acid and 4-Amyloxycinnamic Acid in Toluene

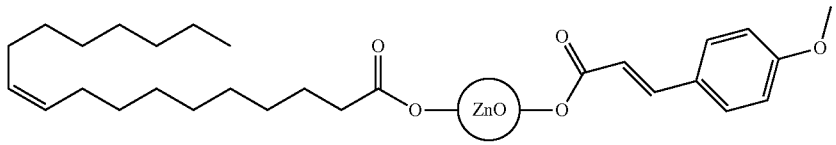

The ZnO preparation was carried out analogously to Example 2. The ZnO functionalization was carried out with a mixture of oleic acid (0.001875 mol) and 4-methoxycinnamic acid (0.00375 mol). A homogeneously slightly cloudy ZnO-containing solution was formed.

Measurement of the UV spectrum revealed a $\lambda_{max}$ (toluene): 294 nm

Example 4

Precipitation of ZnO from $ZnCl_2$ and NaOH in Isopropanol and Subsequent Modification with a Mixture of Oleic Acid and a Carboxylic-Acid-Containing Benzotriazole in Toluene

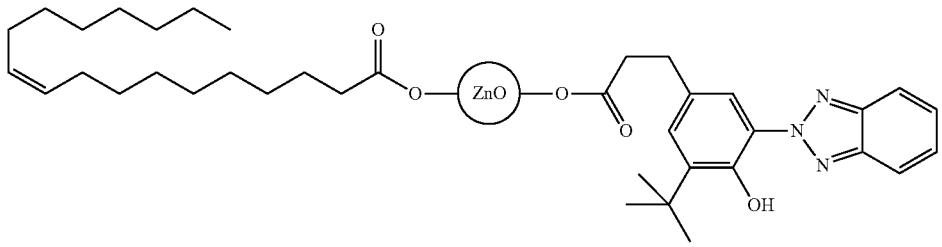

The ZnO preparation was carried out analogously to example 2. The ZnO functionalization was carried out with a mixture of oleic acid (0.001875 mol) and a carboxylic-acid-containing benzotriazole (0.00375 mol, prepared by a hydrolysis of Tinuvin 384-2 from Ciba Specialty Chemicals). A homogeneously slightly cloudy ZnO-containing solution was formed.

Measurement of the UV spectrum revealed $\lambda_{max}$ (toluene): 348, 307 nm.

The invention claimed is:

1. A process for preparing modified ZnO particles, the process comprising:
    mixing a zinc salt and a base in a polar solvent to give a first mixture which comprises zinc oxide;
    removing the polar solvent from the first mixture by distillation, filtration, centrifugation, or decantation, to obtain a residue which comprises zinc oxide, or which comprises zinc oxide and at least one further by-product;
    directly taking up said residue after removing the polar solvent into a nonpolar solvent to give a second mixture;
    adding at least one surface-active substance to the second mixture, to give a third mixture which comprises the modified zinc oxide particles;
    adding at least one further effect substance that is a UV absorber to the third mixture, to give a fourth mixture containing modified ZnO particles; and then
    separating off the modified ZnO particles from any by-products in the fourth mixture.

2. The process according to claim 1, wherein the polar solvent is water, an alcoholic solvent, an aqueous solvent, or an alcohol/water mixture.

3. The process according to claim 1, wherein the zinc salt is zinc chloride, zinc acetate, or zinc acetate dihydrate.

4. The process according to claim 1, wherein the zinc salt is at least one salt consisting of zinc and saturated or unsaturated carboxylic acids having from 10 to 30 carbon atoms.

5. The process according to claim 1, wherein the base is an alkali metal hydroxide, an alkaline earth metal hydroxide, or ammonium hydroxide.

6. The process according to claim 1, wherein the nonpolar solvent is an aromatic or aliphatic hydrocarbon or a solvent mixture comprising at least one aromatic and/or aliphatic hydrocarbon.

7. The process according to claim 1, wherein the at least one surface-active substance is a carboxylic acid with from 10 to 30 carbon atoms.

8. The process according to claim 1, further comprising adding to the third mixture at least one further effect substance that is a stabilizer, a flame retardant, an antioxidant, or a free-radical scavenger.

9. The process according to claim 1, wherein the UV absorber is covalently linked to the ZnO particles.

10. The process according to claim 9, wherein the UV absorber is a compound of formulae —Y—Z which enter into a covalent interaction with the ZnO particles, wherein the linker —Y— is

 (L1)

 (L2)

 (L3)

-continued

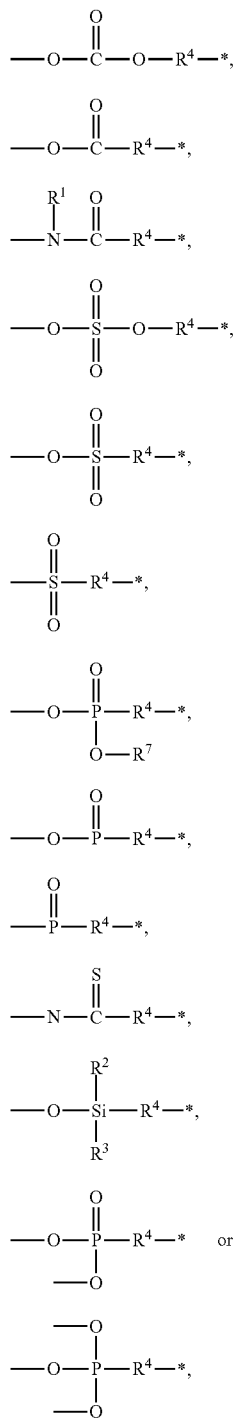

(L4)
(L5)
(L6)
(L7)
(L8)
(L9)
(L10)
(L11)
(L12)
(L13)
(L14)
(L19)

(L20)

wherein "*" corresponds to the bond to the functional group Z,
and furthermore
$R^1$ is H, $C_1$-$C_{20}$-alkyl, aryl, arylalkyl, a heterocycle, or $C_1$-$C_{20}$-alkylcarbonyl,
$R^2$, $R^3$ independently of one another are OH, $C_1$-$C_{20}$-alkoxy, $C_1$-$C_{20}$-alkyl, aryl, arylalkyl, or a heterocycle,
$R^4$ is a chemical single bond, $O_1$, $C_1$-$C_{20}$-alkylene, or $C_1$-$C_{20}$-alkylene-$R^5$, $R^5$ is O, N, S, N($R^6$)—C=O, N—$CO_2$, $O_2C$, $CO_2$, $O_2CN$, $OCO_2$,

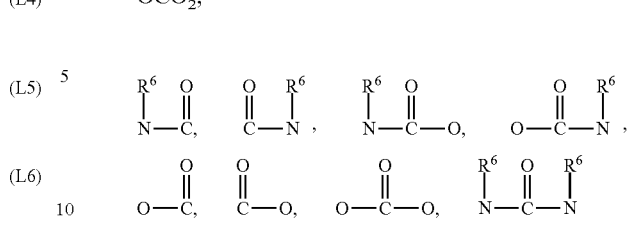

$R^6$ is H or $C_1$-$C_{20}$-alkyl,
$R^7$ is H or a metal cation,
wherein $R^1$ to $R^4$ and/or $R^6$ are in each case optionally interrupted at any desired position by one or more heteroatoms, where the number of these heteroatoms is not more than 10, and/or are in each case optionally substituted at any desired position, but not more than five times, by a specified group which is $C_1$-$C_{20}$-alkyl, $C_1$-$C_{20}$-alkoxy, aryl, aryloxy, at least one heterocycle, at least one heteroatom or halogen, wherein this specified group can likewise be substituted a maximum of twice, by a further one of the specified groups,
and Z is (Z1)

(Z2)

(Z3)

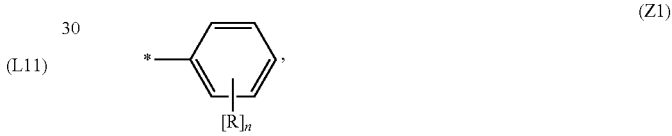

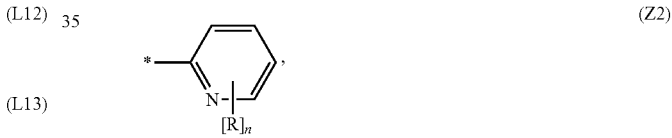

(Z4)

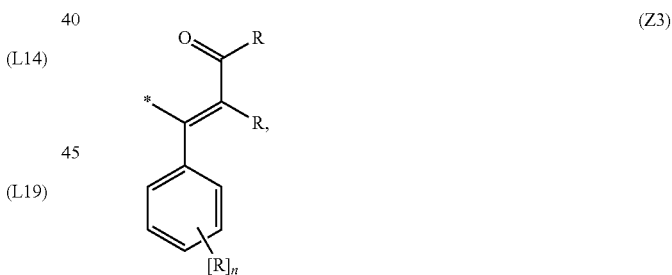

(Z5)

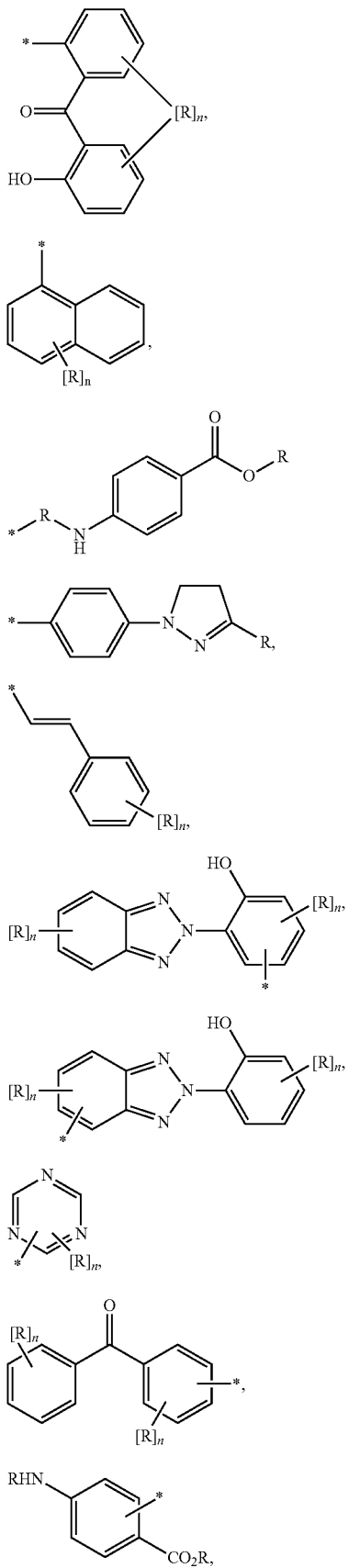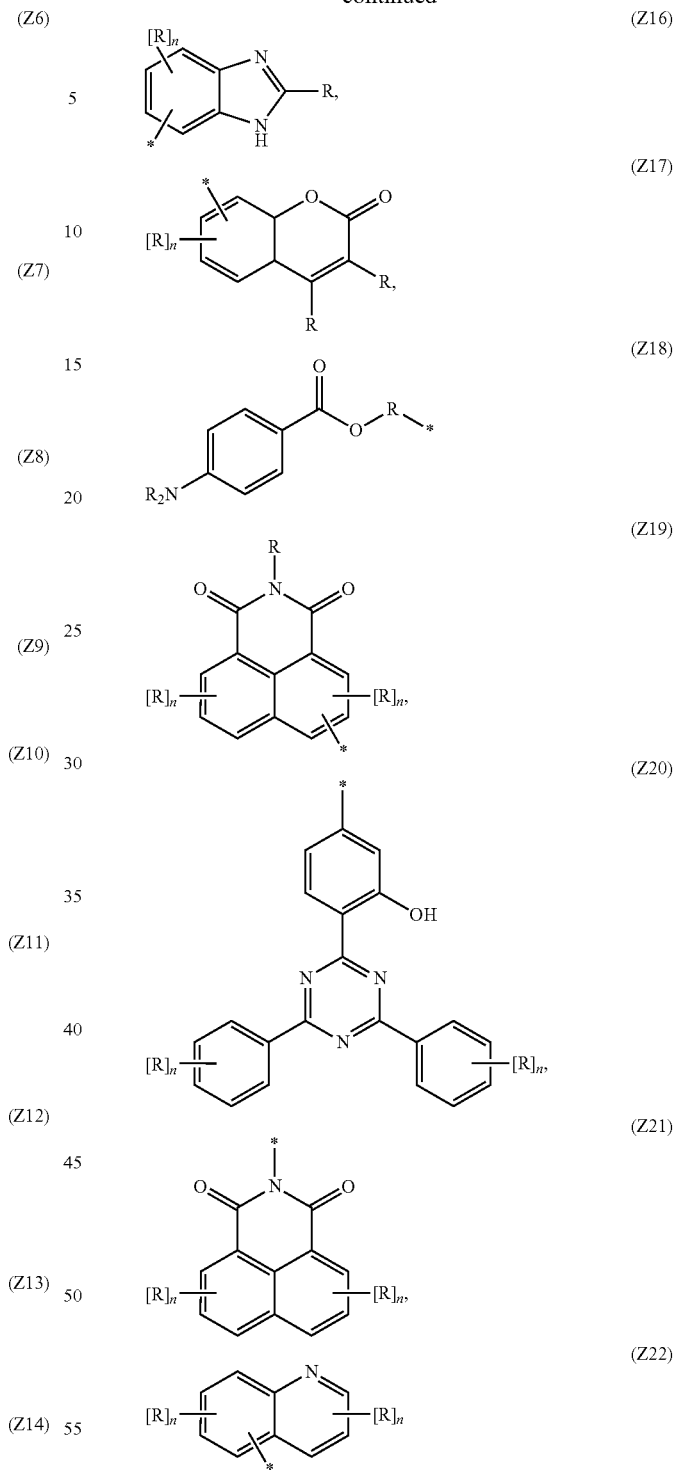

wherein ("*" symbolizes the bonding site to the linker Y),
R is halogen, hydroxy, phenyl, $C_1$-$C_{20}$-alkyl, hydroxyphenyl, $C_1$-$C_{20}$-alkoxy, aryl, aryloxy, amino, mono- or dialkylamino, niltrile, carboxylate, ester, thiol, at least one sulfoxide, sulfonic acid, acyl, formyl, carbonyloxyalkyl, or carbonylaminoalkyl,
n is an integer in a range from 0 to ,
and the n substituents R, independently of one another, may be identical or different, and where the substituent R is optionally interrupted at any desired position by one or more heteroatoms, where the number of these heteroatoms is not more than 10, and/or in each case optionally substituted at any desired position, but not more than five times, by a specified group which is $C_1$-$C_{20}$-alkyl, $C_1$-$C_{20}$-alkoxy, aryl, aryloxy, at least one heterocycle, at least one heteroatom or halogen, wherein this specified group can likewise be substituted a maximum of twice, by a further one of the specified groups.

11. The process according to claim 2, wherein the zinc salt is zinc chloride, zinc acetate, or zinc acetate dihydrate.

12. The process according to claim 2, wherein the zinc salt is at least one salt consisting of zinc and saturated or unsaturated carboxylic acids having from 10 to 30 carbon atoms.

13. A process for preparing modified ZnO particles comprising:
  mixing a zinc salt and a base in a polar solvent to give a first mixture;
  removing the polar solvent from the first mixture and recovering a residue comprising zinc oxide;
  taking up the zinc oxide residue in a non-polar solvent without washing or rinsing the residue to produce a second mixture,
  adding a surface active substance to the second mixture to produce a third mixture which comprises modified zinc oxide particles;
  adding a UV absorbing compound to the third mixture; and
  recovering the modified zinc oxide particles.

14. The process of claim 13, further comprising at least one further effect substance selected from the group consisting of a stabilizer, a flame retardant, an antioxidant, and a free-radical scavenger, to said third mixture to produce a fourth mixture, and recovering the modified zinc oxide particles from the fourth mixture.

15. The method of claim 13, wherein the recovered modified ZnO particles absorb light with a wavelength from the range from 200 to 600 nm and deactivate the absorbed light energy in a nonradiative manner.

\* \* \* \* \*